United States Patent [19]

Iijima et al.

[11] 4,007,066

[45] Feb. 8, 1977

[54] MATERIAL HAVING A HIGH MAGNETIC PERMEABILITY

[75] Inventors: Kenzaburo Iijima; Tomoo Yamagishi, both of Hamamatsu, Japan

[73] Assignee: Nippon Gakki Seizo Kabushiki Kaisha, Japan

[22] Filed: Mar. 12, 1975

[21] Appl. No.: 557,837

Related U.S. Application Data

[63] Continuation-in-part of Ser. No. 338,608, March 6, 1973, abandoned.

[30] Foreign Application Priority Data

Mar. 13, 1972 Japan .............................. 47-25409

[52] U.S. Cl. .............................. 148/31.55; 75/170; 148/120

[51] Int. Cl.$^{2}$ .............................. C04B 35/00

[58] Field of Search ............... 148/31.55, 120, 121; 75/170, 171

[56] References Cited

UNITED STATES PATENTS

| | | | |
|---|---|---|---|
| 2,002,689 | 5/1935 | Bozorth et al. | 148/31.55 |
| 3,348,983 | 10/1967 | Odani et al. | 148/31.55 |
| 3,425,043 | 1/1969 | Olsen et al. | 75/170 |
| 3,723,106 | 3/1973 | Schlenker et al. | 75/170 |
| 3,837,933 | 9/1974 | Masumoto et al. | 148/31.55 |

FOREIGN PATENTS OR APPLICATIONS

| | | | |
|---|---|---|---|
| 1,066,350 | 4/1967 | United Kingdom | 148/31.55 |

*Primary Examiner*—Walter R. Satterfield
*Attorney, Agent, or Firm*—Cushman, Darby & Cushman

[57] ABSTRACT

A material having a high magnetic permeability made by a basic composition consisting of 75–82 weight percent of nickel, 2–6 weight percent of molybdenum, 1 or less weight percent of manganese, 1 or less weight percent of silicon and the remainder iron, and by an additive consisting of at least two different types of elements, one of which types of elements being an element selected from a first group of elements consisting of zirconium, vanadium, tantalum, chromium and tungsten, and the other being at least one element selected from a second group of elements consisting of titanium, zirconium, vanadium, niobium, tantalum, chromium and tungsten but different from said an element of the first group, said additive being contained in said material in an amount within the range of 1–8 weight percent. This material exhibits a high mechanical strength, and a high resistance to wear due to friction and a high magnetic permeability.

11 Claims, 17 Drawing Figures

MATERIAL HAVING A HIGH MAGNETIC PERMEABILITY

CROSS REFERENCE TO RELATED APPLICATIONS

This is a continuation-in-part of application, Ser. No. 338,608, filed Mar. 6, 1973 now abandoned, the entire disclosure of which is incorporated by reference herein.

BACKGROUND OF THE INVENTION

1. Field of the Invention

The present invention is concerned with materials having a high magnetic permeability.

2. Description of the Prior Art

Permalloys and sendust alloys which are known as alloys having a high magnetic permeability suitable for use as magnetic heads are superior in their resistance to wear from friction as compared with those known magnetic materials made of other kinds of alloys. However, these permalloys and sendust alloys are defective in that their resistance to wear from friction is not sufficient for use as magnetic head cores and that their service life is accordingly relatively short.

On the other hand, there has been made, of late, an improvement in the magnetic property of magnetic tapes, and there have been placed on the market magnetic tapes which employ hard magnetic materials. As a result, there is an increasing demand for the production of magnetic head cores made of materials having an enhanced resistance to wear from friction.

SUMMARY OF THE INVENTION

It is, therefore, a primary object of the present invention to eliminate the drawbacks of the prior art and provide a material having a high magnetic permeability and yet having a high mechanical strength and a high resistance to wear caused by friction, to meet the aforesaid demand.

Another object of the present invention is to provide a material of the type described, made with a basic composition consisting of 75–82 weight percent of Ni, 2–6 weight percent of Mo, 1 or less weight percent of Mn, 1 or less weight percent of Si, and the remainder being Fe, and containing therein an additive consisting of 2 or more different kinds of elements of specific combinations selected from Ti, Zr, V, Nb, Ta, Cr and W.

DETAILED DESCRIPTION OF THE PREFERRED EMBODIMENT

As a result of an extensive research conducted by the inventors, the present invention has been worked out based on their discovery that the resistance to wear from friction of 78-permalloy which has been used widely in certain fields of industry can be remarkably enhanced by the inclusion therein of several kinds of element.

The material having a high magnetic permeability which is prepared according to the present invention consists of a basic compositon:

nickel: 75–82% by weight
molybdenum: 2–6% by weight
manganese: 1 or less % by weight
silicon: 1 or less % by weight
iron: remainder and an additive included in the basic composition and consisting of: an element selected from a 1st group of elements consisting of zirconium, vanadium, tantalum, chromium and tungsten, and at least one element selected from a 2nd group of elements consisting of titanium, zirconium, vanadium, niobium, tantalum, chromium and tungsten, but said element from said second group being different from said an element of the 1st group, said additive being contained in the material in such a way that the total amount of the additive elements is within the range of 1–8 percent by weight.

The reason that said additive consists of at least two different kinds of elements is based on the following finding. That is, it has been found that as the amount of the additive is increased, the hardness of the material is enhanced but its magnetic characteristic weakens, almost irrespective of the number of the elements of which the additive consists. Then, a comparison has been made of the characteristics of the material having the additive consisting of one element with that of the material including the additive consisting of two or more different elements, keeping the amount of the additives in both cases in the same level, and it has further been found that the extent of hardness obtained where the additive consists of one element is much smaller than that of the hardness obtained where the additive consists of two or more different elements, although their magnetic characteristics show much the same value.

Also, the reason that the rate of inclusion of the additive is set at 1–8% by weight is based on the finding that, in case the additive is included in an amount less than 1%, there is produced no satisfactory effect of hardness and that in case it is in excess of 8%, there is resulted a marked loss of magnetic characteristic and that accordingly the value $\mu$ of the initial relative permeability which is required of a material of magnetic head cores will drop to a level less than 10,000.

As the materials of the basic composition which can be used in the manufacture of a material having a high magnetic permeability according to the present invention, it is desirable to use electrolytic nickel having a purity of 99.5% or higher as the nickel component, powder briquet of molybdenum component, electrolytic manganese having a purity of 99% or higher as the manganese component, and metallic silicon having a purity of 98% or higher as the silicon component. As for the materials to serve as the additive elements, it is desirable to use spongy titanium, spongy zirconium, powder vanadium having a purity of 99% or higher, powder niobium having a purity of 99% or higher, tantalum having a purity of 99% or higher, electrolytic chromium having a purity of 99% or higher, and tungsten in powder briquet having a purity of 99% or higher.

Some examples of the present invention are set forth below order that this invention may be understood more clearly. In the absence of express language to the contrary all % refer to % by weight.

EXAMPLES

The same basic composition stated above was used for each example. The following additive elements were added to batches of this basic composition, respectively.

| Number of test pieces | Percentage (weight percent) of elements added |
|---|---|
| 1 | Cr 1.5%; V 1.5%; Ti 2.0%: |
| 2 | W 0.5%; Nb 3.0%: |
| 3 | V 1.0%; Nb 1.5%; Ti 2.0% |
| 4 | Cr 2.0%; Zr 1.0%: |
| 5 | Nb 2.0%; Ta 0.5%; Ti 1.5%; Zr 2.0%: |
| 6 | Nb 3.0%; Cr 2.0%: |
| 7 | Ta 2.0%; Ti 3.0%: |
| 8 | Ti 3.0%; V 2.5%: |
| 9 | Cr 2.0%; Nb 2.0%; Ti 2.0% |

From the resulting respective mixtures were prepared the test pieces in the following manner.

Each mixture was melted in a vacuum condition of $10^{-2}$ Torr or less in a high frequency vacuum induction furnace and the melted material was casted into a block of 40 mm × 100 mm × 150 mm in size by the use of a die made of cast iron. Then, this block was given a hot rolling at 1100° C. to reduce the initial thickness of 40 mm to about 10 mm. The resulting block was subjected to a cold rolling to reduce the thickness to 1.5 mm. This thinned block is then annealed for 2 hours at 800° C. in an annealing furnace. The annealed piece was further subjected to a cold rolling to produce a thin plate of 0.35 mm in thickness. From this thin plate was punched a ring-shaped test piece having the outer diameter of 30 mm and an inner diameter of 22 mm. This ring-shaped test piece was annealed for 2 hours at 1100° C. and was cooled in the furnace until the temperature dropped to 700° C. Thereafter, the test pieces thus obtained were cooled further to 300° C. by varying the speed of cooling.

The property of each of these test pieces was determined and the result is shown in the following Table 1.

As the comparison data, the table contains the values of measurements of the control test pieces which are prepared, under the same condition of preparation as stated above, by including a single additive element in the same basic composition as that used in the preparation of the test pieces representing the present invention, and the table also contains the property of the conventional goods.

Table 1

| Number of test pieces of this invention | Hardness (Hv) | Initial relative permeability ($\mu_o$) | Maximum relative permeability ($\mu$m) | Coercive force (Hc) [A/m] |
|---|---|---|---|---|
| 1 | 200 | 30,000 | 78,000 | 1.75 |
| 2 | 185 | 32,000 | 106,000 | 1.59 |
| 3 | 230 | 25,000 | 100,000 | 2.15 |
| 4 | 185 | 33,000 | 88,000 | 2.39 |
| 5 | 250 | 19,000 | 89,000 | 1.98 |
| 6 | 180 | 40,000 | 115,000 | 1.98 |
| 7 | 225 | 35,000 | 70,000 | 2.00 |
| 8 | 210 | 42,000 | 120,000 | 1.60 |
| 9 | 240 | 36,000 | 105,000 | 1.76 |
| Control test piece containing an additive of 3% of Nb alone | 165 | 32,000 | 95,000 | 1.43 |
| Control test piece containing an additive of 3.5% of Nb alone | 170 | — | — | — |

Table 1-continued

| Number of test pieces of this invention | Hardness (Hv) | Initial relative permeability ($\mu_o$) | Maximum relative permeability ($\mu$m) | Coercive force (Hc) [A/m] |
|---|---|---|---|---|
| Conventional goods | 125 | 25,000<br>100,000 | 100,000<br>300,000 | 1.98 or less |

Notes: In the values of measurements, $\mu$ was calculated by a self-recording fluxmeter from the measured density of magnetic flux at the magnetic field of 0.4 A/m. The values of Hc were sought by first magnetizing the test pieces at 80 A/m and thereafter by inverting their magnetic pole.

From the data of the test pieces No. 2 and of the control test pieces, it will be noted that there is obtained a material having a higher hardness in case tungsten is added jointly with niobium, rather than the case wherein niobium alone is added. It will be noted that, in case the amount of the included additive is the same, the use of two elements, i.e. niobium and tungsten, produces a material having a higher hardness than the instance wherein a single element, i.e. niobium, is used.

It should be understood that the accompanying drawing FIG. 2A shows the relationship of the value of the initial relative permeability relative to the varying total amount of the two additive elements, niobium and molybdenum, which are used at the relative ratio of 3:0.5 in the test piece No. 2 of the present invention.

As a result of further experiments, it has been found that, in the case where the additive consists of each of the following combinations of elements, very satisfactory hardness and sufficient magnetic characteristics are obtained by setting the weight percent of each element to the value within the range as defined below.

| Number of additives | Component of each additive (percentage: weight percent) |
|---|---|
| 1 | Cr 1-2%; V 1-2%; Ti 1-3%: |
| 2 | W 0.2-1%; Nb 2-4%: |
| 3 | V 0.2-1%; Nb 1-3%; Ti 1-3%: |
| 4 | Cr 1-3%; Zr 0.2-1.5%: |
| 5 | Nb 2-4%; Cr 1-3%: |
| 6 | Ta 1-3%; Ti 2-4%: |
| 7 | Ti 2-4%; V 2-3%: |
| 8 | Cr 1-3%; Nb 1-3% (exclusive of a combination of elements: Cr 3%; Nb 3%; Ti 3%) |

In each of these cases, the basic composition for the material is the same as stated above. It should of course be understood that the above described combinations are only examples of the additives employed in the material of the present invention.

As described above, the invention is directed to an alloy material of high magnetic permeability consisting of a base composition consisting of 75-82% Ni, 2-6% Mo, 1% or less of Mn, 1% or less of Si and Fe, in combination with 1-8% of at least 2 different elements as additives, one of which elements is selected from a first group of elements consisting essentially of zirconium, vanadium, tantalum, chromium and tungsten, and the other element being one selected from a second group of elements selected from the group consisting essentially of titanium, zirconium, vanadium, niobium, tantalum, chromium and tungsten, said element from the second group being different from the element of the first group, and the balance being Fe. The Alloys set forth in Tables 1*a*–16*d*, and compositions 17–23, are alloys in accordance with the invention and are characterized by Hv of at least 160 and $\mu$ of at least 10,000. As the total percentage of the combination of said additive elements increases from 1% to 8% with respect to the base composition the Hv value of the respective compositions increases. The percentages of elements set forth in the following Tables are percent by weight, unless otherwise specified. The compositions of Tables 1*a*–16*d* and compositions 17–23 were prepared in a manner similar to that of Example 1. In particular it has been discovered alloy materials consisting of 75–82% Ni, 2–6% Mo, about 0.1 to 1% Mn, about 0.1 to 1% Si, 8–18% Fe, which contain the following combination of said two elements are characterized as alloy materials of high magnetic permeability:

| | Combination of additive elements | Percent by weight |
|---|---|---|
| 1. | Ta + Cr | 2 – 8 % |
| 2. | Nb + W | 2 – 8 |
| 3. | Cr + W | 2 – 8 |
| 4. | Nb + Cr | 2 – 8 |
| 5. | Nb + Ta | 2 – 8 |
| 6. | Nb + V | 2 – 8 |
| 7. | V + W | 6 – 8 |
| 8. | V 30 Cr | 6 – 8 |
| 9. | Ta + Zr | 2 – 8 |
| 10. | V + Zr | 2 – 8 |
| 11. | Zr + W | 2 – 8 |
| 12. | Zr + Cr | 2 – 8 |
| 13. | Ti + W | 2 – 8 |
| 14. | Ti + Cr | 2 – 8 |
| 15. | Zr + Ti | 2 – 8 |
| 16. | Ti + Ta | 2 – 8 |

| | | Percent by weight | | Percent by weight | | Percent by weight |
|---|---|---|---|---|---|---|
| 17. | Cr | 2.0 %, | V | 2.0 %, | Ti | 1.5 % |
| 18. | Cr | 2.0 , | V | 2.0 , | Ti | 2.0 |
| 19. | Cr | 2.0 , | V | 1.0 , | Ti | 3.0 |
| 20. | V | 2.0 , | Nb | 2.0 , | Ti | 2.0 |
| 21. | V | 2.0 , | Nb | 3.0 , | Ti | 2.0 |
| 22. | Cr | 2.0 , | Zr | 1.0 , | Ti | 2.0 |
| 23. | Cr | 1.5 , | Zr | 2.0 , | Ti | 3.0 |

The aforementioned ranges were determined by varying the total amount of said 2 elements in a base compositon comprising 75–82% Ni, 2–6% Mo, 0–1% Mn, 0–1% Si, 7.8–18% Fe.

Tables 1a-1d are directed to varying the amounts of the combination of Ta and Co in the base composition from 2 to 8%.

Table 1a

| Ta % by wt | Cr % by wt | 8% by Weight Ta and Cr in Base Composition* HV | $\mu_o$ | $\mu$m | Hc (A/m) |
|---|---|---|---|---|---|
| 7.9 | 0.1 | 221 | 20,400 | 81,500 | 2.39 |
| 6.0 | 2.0 | 232 | 16,800 | 76,200 | 2.31 |
| 4.0 | 4.0 | 246 | 13,400 | 74,300 | 2.63 |
| 2.0 | 6.0 | 241 | 14,200 | 76,200 | 2.55 |
| 0.1 | 7.9 | 218 | 22,300 | 84,600 | 2.31 |

*Base Composition: 75% by wt Ni; 13% Fe; 1% Mn; 2.0% Mo; 1.0% Si.

Table 1b

| Ta percent | Cr percent | 6% by Weight Ta and Cr in Base Composition* Hv | $\mu_o$ | $\mu$m | Hc (A/m) |
|---|---|---|---|---|---|
| 5 | 1 | 216 | 23,600 | 92,500 | 1.75 |
| 3 | 3 | 218 | 24,600 | 93,600 | 1.67 |
| 1 | 5 | 220 | 21,500 | 89,700 | 1.75 |

*Base Composition: 78% Ni; 13.8% Fe; 0.1% Mn; 2.0% Mo; 0.1% Si.

Table 1c

| Ta Percent | Cr Percent | 4% by Weight Ta and Cr in Base Composition* Hv | $\mu_o$ | $\mu$m | Hc (A/m) |
|---|---|---|---|---|---|
| 3 | 1 | 210 | 29,800 | 102,000 | 1.59 |
| 2 | 2 | 203 | 35,200 | 115,000 | 1.43 |
| 1 | 3 | 201 | 36,100 | 124,000 | 1.43 |

*Base Composition for Table 1c: 82% Ni; 9.8% Fe; 0.1% Mn; 4.0% Mo; 0.1% Si.

Table 1d

| Ta Percent | Cr Percent | 2% Ta and Cr in Base Composition* Hv | $\mu_o$ | $\mu$m | Hc (A/m) |
|---|---|---|---|---|---|
| 1.9 | 0.1 | 172 | 43,200 | 136,000 | 1.19 |
| 1 | 1 | 178 | 45,600 | 141,000 | 1.27 |
| 0.1 | 1.9 | 169 | 50,600 | 152,000 | 1.27 |

*The graph of Figure 1 represents the plots of the Hv vs. % Ta.
Base composition for Table 1d: 82% Ni; 9.8% Fe; 0.1% Mn; 6.0% Mo; 0.1% Si Tables 2*a*–2*d* are directed to alloys and their characteristics derived by varying amounts of Nb and W, combined as said elements, from 2 to 8 % in a base composition.

Table 2a

| Nb Percent | W Percent | 8% by Weight Nb and W as a Base Composition* Hv | $\mu_o$ | $\mu$m | Hc (A/m) |
|---|---|---|---|---|---|
| 7.9 | 0.1 | 225 | 20,100 | 75,300 | 1.67 |
| 6 | 2 | 220 | 21,500 | 78,000 | 1.91 |
| 4 | 4 | 219 | 20,600 | 69,300 | 1.75 |
| 2 | 6 | 209 | 22,300 | 72,400 | 1.75 |
| 0.1 | 7.9 | 196 | 24,300 | 81,500 | 1.67 |

*Base Composition: 75% Ni; 11% Fe; 1.0% Mn; 4.0% Mo and 1.0% Si.

Table 2b

| Nb Percent | W Percent | 6% by Weight Nb and W in Base Composition* Hv | $\mu_o$ | $\mu$m | Hc (A/m) |
|---|---|---|---|---|---|
| 5 | 1 | 192 | 28,600 | 96,000 | 1.59 |
| 3 | 3 | 190 | 29,300 | 101,000 | 1.67 |
| 1 | 5 | 195 | 31,500 | 115,000 | 1.51 |

*Base Composition: 75% Ni; 11% Fe; 1% Mn; 6% Mo; 1% Si.

Table 2c

| Nb Percent | W Percent | 4% by Weight Nb and W in Base Composition* Hv | $\mu_o$ | $\mu$m | Hc (A/m) |
|---|---|---|---|---|---|
| 3 | 1 | 186 | 41,200 | 134,000 | 1.43 |
| 2 | 2 | 187 | 40,200 | 125,000 | 1.35 |
| 1 | 3 | 188 | 45,600 | 141,000 | 1.35 |

*Base Composition: 78% Ni; 12% Fe; 1% Mn; 4% Mo; 1% Si.

Table 2d

| Nb Percent | W Percent | 2% by Weight Nb and W in Base Composition* Hv | $\mu_o$ | $\mu m$ | Hc (A/m) |
|---|---|---|---|---|---|
| 1.9 | 0.1 | 161 | 43,200 | 125,000 | 1.27 |
| 1 | 1 | 162 | 41,500 | 122,000 | 1.35 |
| 0.1 | 1.9 | 160 | 45,300 | 131,000 | 1.27 |

*Base Composition: 75% Ni; 18% Fe; 1% Mn; 3% Mo; 1% Si; Figure 2 is a graph which represents the plot of Hv vs. % Nb in the above compositions.

Tables 3*a*–3*d* are directed to varying the amounts of Cr and W, as said to elements, between 2 and 8%, in a Base Composition.

Table 3a

| Cr Percent | W Percent | 8% Cr and W in a Base Composition* Hv | $\mu_o$ | Hc $\mu m$ | (A/m) |
|---|---|---|---|---|---|
| 7.9 | 0.1 | 215 | 21,500 | 81,600 | 1.67 |
| 6 | 2 | 218 | 22,300 | 84,500 | 1.83 |
| 4 | 4 | 231 | 20,000 | 73,000 | 1.75 |
| 2 | 6 | 213 | 21,600 | 82,300 | 1.83 |
| 0.1 | 7.9 | 196 | 24,300 | 91,500 | 1.67 |

*Base Composition: 75% Ni; 14.8% Fe; 0.1% Mn; 2.0% Mo; 0.1% Si.

Table 3b

| Cr Percent | W Percent | 6% Cr and W in Base Composition* Hv | $\mu_o$ | $\mu m$ | Hc (A/m) |
|---|---|---|---|---|---|
| 5 | 1 | 208 | 25,600 | 92,300 | 1.51 |
| 3 | 3 | 206 | 26,300 | 91,500 | 1.43 |
| 1 | 5 | 202 | 24,800 | 94,200 | 1.43 |

*Base Composition: 76% Ni; 12% Fe; 1% Mn; 4.0% Mo; 1% Si.

Table 3c

| Cr Percent | W Percent | 4% Cr and W in Base Composition* Hv | $\mu_o$ | $\mu m$ | Hc (A/m) |
|---|---|---|---|---|---|
| 3 | 1 | 183 | 34,600 | 115,000 | 1.27 |
| 2 | 2 | 181 | 41,000 | 123,000 | 1.19 |
| 1 | 3 | 180 | 44,500 | 142,000 | 1.27 |

*Base Composition: 77% Ni; 14.8% Fe; 0.1% Mn; 4.0% Mo and 0.1% Si.

Table 3d

| Cr Percent | W Percent | 2% Cr and W in Base Composition* Hv | $\mu_o$ | $\mu m$ | Hc (A/m) |
|---|---|---|---|---|---|
| 1.9 | 0.1 | 161 | 49,800 | 132,000 | 1.11 |
| 1 | 1 | 160 | 51,200 | 146,000 | 0.96 |
| 0.1 | 1.9 | 162 | 48,600 | 139,000 | 1.03 |

*Figure 3 is a graph of Hv plotted vs. Cr in the above compositions. Base composition for Table 3d: 82% Ni; 10% Fe; 1.0% Mn; 4% Mo; 1.0% Si Tables 4*a*–4*d* are directed to varying amounts of the combination of Nb and Cr between 2 to 8% in a Base Composition in accordance with the invention.

Table 4a

| Nb Percent | Cr Percent | 8% Nb and Cr in a Base Composition* Hv | $\mu_o$ | $\mu m$ | Hc (A/m) |
|---|---|---|---|---|---|
| 7.9 | 0.1 | 223 | 21,500 | 74,200 | 2.23 |
| 6 | 2 | 231 | 19,600 | 68,500 | 2.23 |
| 3 | 3 | 231 | 18,200 | 69,400 | 2.47 |

Table 4a-continued

| Nb Percent | Cr Percent | 8% Nb and Cr in a Base Composition* Hv | $\mu_o$ | $\mu m$ | Hc (A/m) |
|---|---|---|---|---|---|
| 2 | 6 | 225 | 19,600 | 72,500 | 2.15 |
| 0.1 | 7.9 | 221 | 21,600 | 69,300 | 1.99 |

Table 4b

| Nb Percent | Cr Percent | 6% Nb and Cr in a Base Composition** Hv | $\mu_o$ | $\mu m$ | Hc (A/m) |
|---|---|---|---|---|---|
| 5 | 1 | 203 | 26,900 | 81,500 | 1.59 |
| 3 | 3 | 194 | 27,300 | 83,300 | 1.67 |
| 1 | 5 | 199 | 26,800 | 81,400 | 1.75 |

Table 4c

| Nb Percent | Cr Percent | 4% Nb and Cr in a Base Composition*** Hv | $\mu_o$ | $\mu m$ | Hc (A/m) |
|---|---|---|---|---|---|
| 3 | 1 | 182 | 34,000 | 102,000 | 1.51 |
| 2 | 2 | 186 | 31,200 | 113,000 | 1.43 |
| 1 | 3 | 180 | 37,200 | 123,000 | 1.67 |

Table 4d

| Nb Percent | Cr Percent | 2% Nb and Cr in a Base Composition**** Hv | $\mu_o$ | $\mu m$ | Hc (A/m) |
|---|---|---|---|---|---|
| 1.9 | 0.1 | 163 | 39,600 | 103,000 | 1.19 |
| 1 | 1 | 171 | 41,200 | 125,000 | 1.35 |
| 0.1 | 1.9 | 166 | 42,100 | 134,000 | 1.27 |

| | Ni | Fe | Mn | Mo | Si |
|---|---|---|---|---|---|
| *Base Composition: | 75.0 | 9.0 | 1.0 | 6.0 | 1.0 |
| **Base Composition: | 75.0 | 11.0 | 1.0 | 6.0 | 1.0 |
| ***Base Composition: | 78.0 | 10.0 | 1.0 | 6.0 | 1.0 |
| ****Base Composition: | 75.0 | 15.0 | 1.0 | 6.0 | 1.0 |

FIG. 4 of the drawings represents a graph of of Hv plotted against % Nb in the above compositions.

Tables 5*a*–5*d* are directed to alloy compositions, and their characteristics and properties, of the invention produced by varying the amounts of the elements Nb and Ta, as additive to a base composition, from 2 to 8%.

Table 5a

| Nb Percent | Ta Percent | 8% Nb and Ta in a Base Composition* Hv | $\mu_o$ | $\mu m$ | Hc (A/m) |
|---|---|---|---|---|---|
| 7.9 | 0.1 | 212 | 21,600 | 72,600 | 2.23 |
| 6 | 2 | 216 | 22,300 | 74,500 | 1.99 |
| 4 | 4 | 225 | 22,500 | 75,200 | 1.91 |
| 2 | 6 | 232 | 18,600 | 68,000 | 2.47 |
| 0.1 | 7.9 | 228 | 17,300 | 74,300 | 2.07 |

Table 5b

| Nb Percent | Ta Percent | 6% Nb and Ta in a Base Composition** Hv | $\mu_o$ | $\mu m$ | Hc (A/m) |
|---|---|---|---|---|---|
| 5 | 1 | 213 | 21,500 | 81,500 | 1.75 |
| 3 | 3 | 220 | 20,400 | 86,000 | 1.59 |

Table 5b-continued

| Nb Percent | Ta Percent | 6% Nb and Ta in a Base Composition** Hv | $\mu_o$ | $\mu$m | Hc (A/m) |
|---|---|---|---|---|---|
| 1 | 5 | 207 | 23,600 | 79,600 | 1.67 |

Table 5c

| Nb Percent | Ta Percent | 4% Nb and Ta in a Base Composition*** Hv | $\mu_o$ | $\mu$m | Hc (A/m) |
|---|---|---|---|---|---|
| 3 | 1 | 192 | 34,600 | 92,300 | 1.59 |
| 2 | 2 | 190 | 37,200 | 102,000 | 1.43 |
| 1 | 3 | 187 | 37,600 | 115,000 | 1.43 |

Table 5d

| Nb Percent | Ta Percent | 2% Nb and Ta in a Base Composition**** Hv | $\mu_o$ | $\mu$m | Hc (A/m) |
|---|---|---|---|---|---|
| 1.9 | 0.1 | 162 | 51,100 | 14,600 | 1.27 |
| 1 | 1 | 168 | 47,200 | 132,000 | 1.35 |
| 0.1 | 1.9 | 172 | 41,000 | 123,000 | 1.27 |

| | Ni | Fe | Mn | Mo | Si |
|---|---|---|---|---|---|
| *Base Composition: | 76.0 | 13.8 | 0.1 | 2.0 | 0.1 |
| **Base Composition: | 76.0 | 14.0 | 1.0 | 2.0 | 1.0 |
| ***Base Composition: | 82.0 | 7.8 | 0.1 | 6.0' | 0.1 |
| ****Base Composition: | 82.0 | 10.0 | 0.1 | 5.8 | 0.1 |

FIG. 5 of the drawings is a graph of the plot of Hv of the above compositions vs. % Nb.

Tables 6*a*–6*d* are to alloys of the invention and their properties, produced by varying the amounts of Nb and V between 2 and 8 % in a base composition to produce alloys of the invention.

Table 6a

| Nb Percent | V Percent | 8% Nb and V in a Base Composition* Hv | $\mu_o$ | $\mu$m | Hc (A/m) |
|---|---|---|---|---|---|
| 7.9 | 0.1 | 201 | 23,400 | 76,500 | 2.23 |
| 6 | 2 | 225 | 19,600 | 81,000 | 2.47 |
| 4 | 4 | 232 | 14,300 | 86,000 | 2.63 |
| 2 | 6 | 215 | 22,600 | 85,400 | 1.99 |
| 0.1 | 7.9 | 218 | 21,900 | 81,000 | 1.91 |

Table 6b

| Nb Percent | V Percent | 6% Nb and V in a Base Composition** Hv | $\mu_o$ | $\mu$m | Hc (A/m) |
|---|---|---|---|---|---|
| 5 | 1 | 203 | 31,500 | 91,000 | 1.83 |
| 3 | 3 | 196 | 32,600 | 82,300 | 1.91 |
| 1 | 5 | 198 | 29,600 | 80,600 | 1.83 |

Table 6c

| Nb Percent | V Percent | 4% Nb and V in a Base Composition*** Hv | $\mu_o$ | $\mu$m | Hc (A/m) |
|---|---|---|---|---|---|
| 3 | 1 | 190 | 35,000 | 92,000 | 1.67 |
| 2 | 2 | 186 | 36,200 | 94,300 | 1.67 |
| 1 | 3 | 187 | 36,100 | 102,000 | 1.83 |

Table 6d

| Nb Percent | V Percent | 2% Nb and V in a Base Composition*** Hv | $\mu_o$ | $\mu$m | Hc (A/m) |
|---|---|---|---|---|---|
| 1.9 | 0.1 | 160 | 42,300 | 143,000 | 1.51 |
| 1 | 1 | 161 | 45,000 | 135,000 | 1.35 |
| 0.1 | 1.9 | 165 | 41,200 | 126,000 | 1.19 |

| | Ni | Fe | Mn | Mo | Si |
|---|---|---|---|---|---|
| *Base Compositions: | 75.0 | 13.0 | 1.0 | 2.0 | 1.0 |
| **Base Compositions: | 78.0 | 13.8 | 0.1 | 2.0 | 0.1 |
| ***Base Compositions: | 82.0 | 9.8 | 0.1 | 4.0 | 0.1 |
| ****Base Compositions: | 82.0 | 9.8 | 0.1 | 6.0 | 0.1 |

FIG. 6 is a graph representing the plot of Hv vs. Nb in the above compositions.

Tables 7*a*–7*c* are directed to compositions of the invention produced by varying the amount of the combination of elements Nb and W between 2 and 8% in base compositions in accordance with the invention.

Table 7a

| V Percent | W Percent | 8% V and W in a Base Composition* Hv | $\mu_o$ | $\mu$m | Hc (A/m) |
|---|---|---|---|---|---|
| 7.9 | 0.1 | 222 | 21,000 | 75,000 | 2.47 |
| 7 | 1.0 | 231 | 18,500 | 73,000 | 2.63 |
| 6 | 2 | 236 | 15,400 | 65,200 | 2.55 |
| 5.5 | 2.5 | 240 | 15,200 | 64,200 | 2.79 |
| 5.1 | 2.9 | 242 | 12,000 | 61,000 | 3.26 |

Table 7b

| V Percent | W Percent | 7% V and W in a Base Composition** Hv | $\mu_o$ | $\mu$m | Hc (A/m) |
|---|---|---|---|---|---|
| 6 | 1 | 231 | 17,200 | 73,000 | 2.71 |
| 5.5 | 1.5 | 221 | 19,500 | 73,500 | 2.55 |
| 5.1 | 1.9 | 210 | 21,000 | 73,800 | 2.47 |

Table 7c

| V Percent | W Percent | 6% V and W in a Base Composition*** Hv | $\mu_o$ | $\mu$m | Hc (A/m) |
|---|---|---|---|---|---|
| 5.9 | 0.1 | 208 | 23,100 | 82,300 | 2.23 |
| 5.1 | 0.9 | 212 | 21,500 | 84,600 | 2.07 |

| | Ni | Fe | Mn | Mo | Si |
|---|---|---|---|---|---|
| *Base Compositions: | 75.0 | 14.8 | 0.1 | 2.0 | 0.1 |
| **Base Compositions: | 76.0 | 10.8 | 0.1 | 6.0 | 0.1 |
| ***Base Compositions: | 76.0 | 10.0 | 1.0 | 6.0 | 1.0 |

FIG. 7 is a graph of the plot of Hv vs. % V in the above compositions.

Tables 8*a*–8*c* are directed to alloys and their properties, produced in accordance with the invention and by varying the amount of V and Cr, as said two elements, between 2 and 8% in above compositions.

Table 8a

| V Percent | Cr Percent | 8% V and Cr in a Base Composition* Hv | $\mu_o$ | $\mu$m | Hc (A/m) |
|---|---|---|---|---|---|
| 7.9 | 0.1 | 219 | 20,500 | 79,000 | 2.39 |
| 7.0 | 1.0 | 231 | 18,500 | 72,000 | 2.47 |
| 6 | 2 | 242 | 13,300 | 76,200 | 2.39 |
| 5.5 | 2.5 | 245 | 13,100 | 68,100 | 2.55 |

Table 8a-continued

| V Percent | Cr Percent | 8% V and Cr in a Base Composition* Hv | $\mu_o$ | $\mu$m | Hc (A/m) |
|---|---|---|---|---|---|
| 5.1 | 2.9 | 246 | 11,500 | 62,300 | 2.62 |

Table 8b

| V Percent | Cr Percent | 7% V and Cr in a Base Composition** Hv | $\mu_o$ | $\mu$m | Hc (A/m) |
|---|---|---|---|---|---|
| 6 | 1 | 225 | 21,600 | 81,000 | 2.23 |
| 5.5 | 1.5 | 218 | 25,000 | 83,200 | 1.99 |
| 5.1 | 1.9 | 210 | 24,900 | 82,600 | 1.91 |

Table 8c

| V Percent | Cr Percent | 6% V and Cr in a Base Composition*** Hv | $\mu_o$ | $\mu$m | Hc (A/m) |
|---|---|---|---|---|---|
| 5.9 | 0.1 | 200 | 25,100 | 84,000 | 1.91 |
| 5.1 | 0.9 | 198 | 26,100 | 85,200 | 1.83 |

| | Ni | Fe | Mn | Mo | Si |
|---|---|---|---|---|---|
| *Base Compositions: | 75.0 | 13.0 | 1.0 | 2.0 | 1.0 |
| **Base Compositions: | 78.0 | 12.8 | 0.1 | 2.0 | 0.1 |
| ***Base Compositions: | 76.0 | 12.0 | 1.0 | 4.0 | 1.0 |

FIG. 8 of the drawings is a graph of the plot of Hv of the above compositions versus the % V.

Tables 9*a*–9*d* are directed to alloy compositions of the invention, as well as their properties, produced by varying the amount of Zr and Ta, as said two elements in a base composition, between 2 and 8%.

Table 9a

| Zr Percent | Ta Percent | 8% Zr and Ta in a Base Composition* Hv | $\mu_o$ | $\mu$m | Hc (A/m) |
|---|---|---|---|---|---|
| 7.9 | 0.1 | 210 | 25,000 | 81,000 | 1.67 |
| 6.0 | 2 | 231 | 21,000 | 72,000 | 1.99 |
| 4 | 4 | 220 | 23,300 | 79,000 | 1.75 |
| 2 | 6 | 224 | 21,400 | 76,000 | 1.83 |
| 0.1 | 7.9 | 231 | 20,000 | 81,000 | 1.91 |

Table 9b

| Zr Percent | Ta Percent | 6% Zr and Ta in a Base Composition** Hv | $\mu_o$ | $\mu$m | Hc (A/m) |
|---|---|---|---|---|---|
| 5 | 1 | 210 | 26,700 | 91,000 | 1.83 |
| 3 | 3 | 208 | 25,600 | 102,000 | 1.91 |
| 1 | 5 | 203 | 28,900 | 106,000 | 1.67 |

Table 9c

| Zr Percent | Ta Percent | 4% Zr and Ta in a Base Composition*** Hv | $\mu_o$ | $\mu$m | Hc (A/m) |
|---|---|---|---|---|---|
| 3 | 1 | 186 | 34,500 | 112,000 | 1.51 |
| 2 | 2 | 184 | 33,600 | 123,000 | 1.43 |
| 1 | 3 | 186 | 34,100 | 134,000 | 1.51 |

Table 9d

| Zr Percent | Ta Percent | 2% Zr and Ta in a Base Composition**** Hv | $\mu_o$ | $\mu$m | Hc (A/m) |
|---|---|---|---|---|---|
| 1.9 | 0.1 | 161 | 42,300 | 121,000 | 1.51 |
| 1 | 1 | 166 | 46,500 | 126,000 | 1.43 |
| 0.1 | 1.9 | 172 | 35,200 | 99,000 | 1.59 |

| | Ni | Fe | Mn | Mo | Si |
|---|---|---|---|---|---|
| *Base Compositions: | 77.0 | 12.8 | 0.1 | 2.0 | 0.1 |
| **Base Compositions: | 76.0 | 14.0 | 1.0 | 2.0 | 1.0 |
| ***Base Compositions: | 82.0 | 7.8 | 0.1 | 6.0 | 0.1 |
| ****Base Compositions: | 82.0 | 9.8 | 0.1 | 6.0 | 0.1 |

FIG. 9 of the drawings is directed to compositions of Tables 9*a*–9*d* and is a graph of the plot of Hv of the respective compositions versus % Zr.

Tables 10*a*–10*d* are directed to alloy compositions of the invention, as well as their properties, produced by varying the amount of Zr and V, said two elements in a base composition, between 2 and 8%.

Table 10a

| Zr Percent | V Percent | 8% (Zr and V) in a Base Composition* Hv | $\mu_o$ | $\mu$m | Hc (A/m) |
|---|---|---|---|---|---|
| 7.9 | 0.1 | 230 | 20,000 | 73,000 | 1.75 |
| 6 | 2.0 | 215 | 23,500 | 81,000 | 1.59 |
| 4 | 4 | 215 | 22,000 | 75,000 | 1.75 |
| 2 | 6 | 210 | 24,000 | 85,000 | 1.51 |
| 0.1 | 7.9 | 216 | 22,300 | 79,000 | 1.67 |

Table 10b

| Zr Percent | V Percent | 6% (Zr and V) in a Base Composition** Hv | $\mu_o$ | $\mu$m | Hc (A/m) |
|---|---|---|---|---|---|
| 5 | 1 | 189 | 23,100 | 91,000 | 1.67 |
| 3 | 3 | 193 | 21,000 | 90,000 | 1.51 |
| 1 | 5 | 196 | 34,000 | 120,000 | 1.43 |

Table 10c

| Zr Percent | V Percent | 4% (Zr and V) in a Base Composition*** Hv | $\mu_o$ | $\mu$m | Hc (A/m) |
|---|---|---|---|---|---|
| 3 | 1 | 183 | 34,200 | 113,000 | 1.67 |
| 2 | 2 | 186 | 33,000 | 102,000 | 1.59 |
| 1 | 3 | 190 | 31,000 | 98,000 | 1.83 |

Table 10d

| Zr Percent | V Percent | 2% (Zr and V) in a Base Composition**** Hv | $\mu_o$ | $\mu$m | Hc (A/m) |
|---|---|---|---|---|---|
| 1.9 | 0.1 | 160 | 38,100 | 81,000 | 1.67 |
| 1 | 1 | 163 | 35,000 | 78,000 | 1.75 |
| 0.1 | 1.9 | 161 | 41,000 | 91,000 | 1.43 |

| | Ni | Fe | Mn | Mo | Si |
|---|---|---|---|---|---|
| *Base Compositions: | 75.0 | 14.8 | 0.1 | 2.0 | 0.1 |
| **Base Compositions: | 76.0 | 12.0 | 1.0 | 4.0 | 1.0 |
| ***Base Compositions: | 75.0 | 14.8 | 0.1 | 6.0 | 0.1 |
| ****Base Compositions: | 82.0 | 8.0 | 1.0 | 6.0 | 1.0 |

FIG. 10 of the drawings is a graph of the plot of Hv of the above compositions versus the % Zr of the above compositions.

Tables 11*a*–11*d* are directed to alloy compositions of the invention, and their properties, said alloys produced by varying the amount of the combination Zr and W, as said two elements, between 2 and 8% in a base composition in accordance with the invention.

Table 11a

| Zr Percent | W Percent | 8% (Zr and W) in a Base Composition* Hv | $\mu_o$ | $\mu$m | Hc (A/m) |
|---|---|---|---|---|---|
| 7.9 | 0.1 | 240 | 19,000 | 71,000 | 2.39 |
| 6 | 2 | 225 | 24,600 | 91,000 | 2.23 |
| 4 | 4 | 220 | 26,500 | 103,000 | 2.23 |
| 2 | 6 | 205 | 29,600 | 110,000 | 1.83 |
| 0.1 | 7.9 | 192 | 35,400 | 120,000 | 1.51 |

Table 11b

| Zr Percent | W Percent | 6% (Zr and W) in a Base Composition** Hv | $\mu_o$ | $\mu$m | Hc (A/m) |
|---|---|---|---|---|---|
| 5 | 1 | 206 | 32,800 | 89,000 | 1.43 |
| 3 | 3 | 201 | 36,200 | 92,000 | 1.35 |
| 1 | 5 | 191 | 39,300 | 101,000 | 1.43 |

Table 11c

| Zr Percent | W Percent | 4% (Zr and W) in a Base Composition*** Hv | $\mu_o$ | $\mu$m | Hc (A/m) |
|---|---|---|---|---|---|
| 3 | 1 | 186 | 41,200 | 116,000 | 1.27 |
| 2 | 2 | 187 | 39,200 | 123,000 | 1.27 |
| 1 | 3 | 183 | 38,600 | 115,000 | 1.19 |

Table 11d

| Zr Percent | W Percent | 2% (Zr and W) in a Base Composition**** Hv | $\mu_o$ | $\mu$m | Hc (A/m) |
|---|---|---|---|---|---|
| 1.9 | 0.1 | 167 | 46,300 | 134,000 | 1.59 |
| 1 | 1 | 160 | 47,800 | 142,000 | 1.43 |
| 0.1 | 1.9 | 163 | 51,000 | 151,000 | 1.27 |

| | Ni | Fe | Mn | Mo | Si |
|---|---|---|---|---|---|
| *Base Compositions: | 75.0 | 14.8 | 0.1 | 2.0 | 0.1 |
| **Base Compositions: | 76.0 | 14.0 | 1.0 | 2.0 | 1.0 |
| ***Base Compositions: | 76.0 | 13.8 | 0.1 | 6.0 | 0.1 |
| ****Base Compositions: | 82.0 | 10.0 | 1.0 | 4.0 | 1.0 |

FIG. 11 is directed to a graph of the plot of characteristic Hv of the above composition versus the plot of % Zr.

Tables 12*a*–12*d* are directed to alloy compositions of the invention, as well as their properties, said alloy, produced by varying the amounts of the combinations of Zr and Cr, as said two elements, between 2 and 8% in a base composition in accordance with the invention.

Table 12a

| Zr Percent | Cr Percent | 8% (Zr and Cr) in a Base Composition* Hv | $\mu_o$ | $\mu$m | Hc (A/m) |
|---|---|---|---|---|---|
| 7.9 | 0.1 | 215 | 23,000 | 76,000 | 1.67 |
| 6 | 2 | 210 | 24,300 | 82,000 | 1.59 |
| 4 | 4 | 210 | 23,300 | 86,000 | 1.75 |
| 2 | 6 | 205 | 25,100 | 91,000 | 1.59 |
| 0.1 | 7.9 | 210 | 23,600 | 79,500 | 1.75 |

Table 12b

| Zr Percent | Cr Percent | 6% (Zr and Cr) in a Base Composition** Hv | $\mu_o$ | $\mu$m | Hc (A/m) |
|---|---|---|---|---|---|
| 5 | 1 | 185 | 23,200 | 93,000 | 1.67 |
| 3 | 3 | 191 | 22,000 | 92,000 | 1.59 |
| 1 | 5 | 193 | 35,000 | 119,000 | 1.51 |

Table 12c

| Zr Percent | Cr Percent | 4% (Zr and Cr) in a Base Composition*** Hv | $\mu_o$ | $\mu$m | Hc (A/m) |
|---|---|---|---|---|---|
| 3 | 1 | 184 | 36,500 | 121,000 | 1.51 |
| 2 | 2 | 190 | 35,200 | 115,000 | 1.51 |
| 1 | 3 | 192 | 32,000 | 102,000 | 1.67 |

Table 12d

| Zr Percent | Cr Percent | 2% (Zr and Cr) in a Base Composition**** Hv | $\mu_o$ | $\mu$m | Hc (A/m) |
|---|---|---|---|---|---|
| 1.9 | 0.1 | 165 | 42,500 | 84,000 | 1.59 |
| 1 | 1 | 164 | 41,600 | 81,000 | 1.67 |
| 0.1 | 1.9 | 163 | 43,600 | 81,000 | 1.51 |

| | Ni | Fe | Mn | Mo | Si |
|---|---|---|---|---|---|
| *Base Compositions: | 75.0 | 12.0 | 1.0 | 3.0 | 1.0 |
| **Base Compositions: | 75.0 | 11.0 | 1.0 | 6.0 | 1.0 |
| ***Base Compositions: | 78.0 | 14.0 | 1.0 | 2.0 | 1.0 |
| ****Base Compositions: | 75.0 | 18.0 | 1.0 | 3.0 | 1.0 |

FIG. 12 of the drawings is a graph which is the plot of Hv characteristic of the above compositions vs. the plot of the % Zr of the compositions.

Tables 13*a*–13*d* are directed to alloy compositions of the invention produced by varying the amount of the combination of Ti and W, as said two element, between 2 and 8% in a base composition in accordance with the invention.

Table 13a

| Ti Percent | W Percent | 8% (Ti and W) in a Base Composition* Hv | $\mu_o$ | $\mu$m | Hc (A/m) |
|---|---|---|---|---|---|
| 7.9 | 0.1 | 251 | 14,000 | 62,000 | 2.47 |
| 6 | 2 | 275 | 10,000 | 53,000 | 2.63 |
| 4 | 4 | 260 | 12,500 | 59,000 | 2.47 |
| 2 | 6 | 210 | 23,200 | 81,000 | 1.67 |
| 0.1 | 7.9 | 180 | 29,800 | 91,000 | 1.51 |

Table 13b

| Ti Percent | W Percent | 6% (Ti and W) in a Base Composition** Hv | $\mu_o$ | $\mu$m | Hc (A/m) |
|---|---|---|---|---|---|
| 5 | 1 | 250 | 14,000 | 66,000 | 2.39 |
| 3 | 3 | 230 | 20,500 | 76,000 | 1.91 |
| 1 | 5 | 190 | 25,100 | 86,000 | 1.59 |

Table 13c

| Ti Percent | W Percent | 4% (Ti and W) in a Base Composition*** Hv | $\mu_o$ | $\mu$m | Hc (A/m) |
|---|---|---|---|---|---|
| 3 | 1 | 210 | 24,000 | 83,000 | 1.67 |
| 2 | 2 | 182 | 35,000 | 101,000 | 1.43 |

Table 13c-continued

| Ti Percent | W Percent | 4% (Ti and W) in a Base Composition*** Hv | $\mu_o$ | $\mu m$ | Hc (A/m) |
|---|---|---|---|---|---|
| 1 | 3 | 180 | 41,000 | 120,000 | 1.19 |

Table 13d

| Ti Percent | W Percent | 2% (Ti and W) in a Base Composition**** Hv | $\mu_o$ | $\mu m$ | Hc (A/m) |
|---|---|---|---|---|---|
| 1.9 | 0.1 | 162 | 43,000 | 134,000 | 1.11 |
| 1 | 1 | 168 | 39,000 | 121,000 | 1.03 |
| 0.1 | 1.9 | 163 | 41,000 | 152,000 | 1.27 |

| | Ni | Fe | Mn | Mo | Si |
|---|---|---|---|---|---|
| *Base Compositions: | 77.0 | 12.8 | 0.1 | 2.0 | 0.1 |
| **Base Compositions: | 76.0 | 12.0 | 1.0 | 4.0 | 1.0 |
| ***Base Compositions: | 82.0 | 9.8 | 0.1 | 4.0 | 0.1 |
| ****Base Compositions: | 82.0 | 12.8 | 0.1 | 3.0 | 0.1 |

FIG. 13 of the drawings is a graph of the plot of the Hv value of the above compositions vs. the plot of the % Ti of the above compositions.

Tables 14*a*–14*d* are directed to alloy compositions of the invention, produced by varying the amount of the combinations of Ti and Cr, as said two elements, between 2 and 8% in a base composition in accordance with the invention.

Table 14a

| Ti Percent | Cr Percent | 8% (Ti and Cr) in a Base Composition* Hv | $\mu_o$ | $\mu m$ | Hc (A/m) |
|---|---|---|---|---|---|
| 7.9 | 0.1 | 251 | 13,500 | 69,300 | 2.31 |
| 6.0 | 2 | 273 | 11,200 | 61,000 | 2.47 |
| 4 | 4 | 250 | 14,000 | 68,000 | 2.23 |
| 2 | 6 | 223 | 24,500 | 80,100 | 1.51 |
| 0.1 | 7.9 | 215 | 22,000 | 76,000 | 1.67 |

Table 14b

| Ti Percent | Cr Percent | 6% (Ti and Cr) in a Base Composition** Hv | $\mu_o$ | $\mu m$ | Hc (A/m) |
|---|---|---|---|---|---|
| 5 | 1 | 245 | 14,000 | 72,000 | 1.99 |
| 3 | 3 | 230 | 14,800 | 85,000 | 1.83 |
| 1 | 5 | 195 | 24,000 | 96,000 | 1.43 |

Table 14c

| Ti Percent | Cr Percent | 4% (Ti and Cr) in a Base Composition*** Hv | $\mu_o$ | $\mu m$ | Hc (A/m) |
|---|---|---|---|---|---|
| 3 | 1 | 210 | 21,000 | 92,000 | 1.75 |
| 2 | 2 | 190 | 26,000 | 102,000 | 1.67 |
| 1 | 3 | 180 | 31,000 | 120,000 | 1.59 |

Table 14d

| Ti Percent | Cr Percent | 2% (Ti and Cr) in a Base Composition**** Hv | $\mu_o$ | $\mu m$ | Hc (A/m) |
|---|---|---|---|---|---|
| 1.9 | 0.1 | 163 | 42,000 | 112,000 | 1.03 |
| 1 | 1 | 162 | 45,000 | 142,000 | 1.03 |
| 0.1 | 1.9 | 160 | 56,000 | 162,000 | 0.96 |

Table 14d-continued

| | Ni | Fe | Mn | Mo | Si |
|---|---|---|---|---|---|
| *Base Compositions: | 75.0 | 12.8 | 0.1 | 4.0 | 0.1 |
| **Base Compositions: | 76.0 | 14.0 | 1.0 | 2.0 | 1.0 |
| ***Base Compositions: | 75.0 | 14.8 | 0.1 | 6.0 | 0.1 |
| ****Base Compositions: | 82.0 | 8.0 | 1.0 | 6.0 | 1.0 |

FIG. 14 of the drawings is a graph of the value Hv of the above compositions plotted against the value % Ti in the above compositions.

Tables 15*a*–15*d* are directed to alloy compositions of the invention produced by varying the amount of the combination of Zr and Ti, as said two elements, between 2 and 8% in a base composition in accordance with the invention.

Table 15a

| Ti Percent | Zr Percent | 8% (Zr and Ti) in a Base Composition* Hv | $\mu_o$ | $\mu m$ | Hc (A/m) |
|---|---|---|---|---|---|
| 7.9 | 0.1 | 253 | 12,000 | 70,000 | 2.39 |
| 6 | 2 | 255 | 13,000 | 68,000 | 2.47 |
| 4 | 4 | 250 | 12,000 | 72,000 | 2.47 |
| 2 | 6 | 210 | 22,000 | 82,000 | 2.15 |
| 0.1 | 7.9 | 200 | 34,000 | 92,000 | 1.83 |

Table 15b

| Ti Percent | Zr Percent | 6% (Zr and Ti) in a Base Composition** Hv | $\mu_o$ | $\mu m$ | Hc (A/m) |
|---|---|---|---|---|---|
| 5 | 1 | 230 | 11,000 | 68,000 | 2.63 |
| 3 | 3 | 210 | 18,000 | 81,000 | 2.23 |
| 1 | 5 | 192 | 39,000 | 90,000 | 1.75 |

Table 15c

| Ti Percent | Zr Percent | 4% (Zr and Ti) in a Base Composition*** Hv | $\mu_o$ | $\mu m$ | Hc (A/m) |
|---|---|---|---|---|---|
| 3 | 1 | 205 | 33,000 | 102,000 | 1.67 |
| 2 | 2 | 190 | 45,000 | 110,000 | 1.19 |
| 1 | 3 | 180 | 50,000 | 163,000 | 0.88 |

Table 15d

| Ti Percent | Zr Percent | 2% (Zr and Ti) in a Base Composition*** Hv | $\mu_o$ | $\mu m$ | Hc (A/m) |
|---|---|---|---|---|---|
| 1.9 | 0.1 | 165 | 48,000 | 140,000 | 1.19 |
| 1.0 | 1.0 | 163 | 50,000 | 141,000 | 1.11 |
| 0.5 | 1.5 | 160 | 48,000 | 158,000 | 0.96 |

| | Ni | Fe | Mn | Mo | Si |
|---|---|---|---|---|---|
| *Base Compositions: | 75.0 | 13.0 | 1.0 | 2.0 | 1.0 |
| **Base Compositions: | 78.0 | 10.8 | 0.1 | 5.0 | 0.1 |
| ***Base Compositions: | 82.0 | 8.8 | 0.1 | 5.0 | 0.1 |
| ****Base Compositions: | 82.0 | 10.8 | 0.1 | 5.0 | 0.1 |

FIG. 15 of the drawings is a graph of the plot of the Hv values of the above compositions vs. the plot of % Ti in the above compositions.

Tables 16*a*–16*d* are directed to alloy compositions of the invention which were prepared by varying the amount of the combination of Ti and Ta, as said two elements, between 2 and 8%, in a base composition in accordance with the invention.

Table 16a

| Ti Percent | Ta Percent | 8% (Ti and Ta) in a Base Composition* Hv | $\mu_o$ | $\mu m$ | Hc (A/m) |
|---|---|---|---|---|---|
| 7.9 | 0.1 | 255 | 16,000 | 72,000 | 2.55 |
| 6.0 | 2.0 | 270 | 13,000 | 67,000 | 2.63 |
| 4.0 | 4.0 | 285 | 11,000 | 59,000 | 2.79 |
| 2.0 | 6.0 | 230 | 19,000 | 80,000 | 2.23 |
| 0.1 | 7.9 | 190 | 24,000 | 86,000 | 1.75 |

Table 16b

| Ti Percent | Ta Percent | 6% (Ti and Ta) in a Base Composition** Hv | $\mu_o$ | $\mu m$ | Hc (A/m) |
|---|---|---|---|---|---|
| 5 | 1 | 261 | 15,000 | 69,000 | 2.63 |
| 3 | 3 | 243 | 18,000 | 76,000 | 2.47 |
| 1 | 5 | 202 | 29,000 | 84,000 | 1.91 |

Table 16c

| Ti Percent | Ta Percent | 4% (Ti and Ta) in a Base Composition*** Hv | $\mu_o$ | $\mu m$ | Hc (A/m) |
|---|---|---|---|---|---|
| 3 | 1 | 212 | 38,500 | 82,000 | 1.67 |
| 2 | 2 | 193 | 42,300 | 85,000 | 1.43 |
| 1 | 3 | 181 | 49,000 | 102,000 | 1.03 |

Table 16d

| Ti Percent | Ta Percent | 2% (Ti and Ta) in a Base Composition**** Hv | $\mu_o$ | $\mu m$ | Hc (A/m) |
|---|---|---|---|---|---|
| 1.9 | 0.1 | 163 | 41,500 | 110,000 | 0.96 |
| 1 | 1 | 160 | 46,000 | 132,000 | 0.88 |
| 0.1 | 1.9 | 160 | 55,000 | 151,000 | 0.80 |

| | Ni | Fe | Mn | Mo | Si |
|---|---|---|---|---|---|
| *Base Compositions: | 77.0 | 10.8 | 0.1 | 4.0 | 0.1 |
| **Base Compositions: | 76.0 | 14.0 | 1.0 | 2.0 | 1.0 |
| ***Base Compositions: | 82.0 | 10.8 | 0.1 | 3.0 | 0.1 |
| ****Base Compositions: | 82.0 | 9.8 | 0.1 | 6.0 | 0.1 |

FIG. 16 of the drawings is a graph of the plot of the Hv values of the above compositions vs. the plot the % Ti of the above compositions.

Compositions 17 through 23 are alloy compositions produced by including three elements in combination as said additive to a base composition in accordance with the invention.

Table

Compositions of the Invention Wherein Three Additives are Included in the Base Composition

| | Base Compositions | | | | | Additives | | | | | Properties | | | |
|---|---|---|---|---|---|---|---|---|---|---|---|---|---|---|
| | % Ni | % Fe | % Mn | % Mo | % Si | % Cr | % V | % Ti | % Nb | % Zr | Hv | $\mu_o$ | $\mu m$ | Hc (A/m) |
| No. 17 | 78.0 | 10.5 | 0.5 | 5.0 | 0.5 | 2.0 | 2.0 | 1.5 | | | 230 | 23,500 | 69,300 | 2.07 |
| No. 18 | 77.0 | 12.0 | 0.5 | 4.0 | 0.5 | 2.0 | 2.0 | 2.0 | | | 235 | 20,600 | 63,200 | 1.99 |
| No. 19 | 75.0 | 11.0 | 1.0 | 6.0 | 1.0 | 2.0 | 1.0 | 3.0 | | | 236 | 21,200 | 65,200 | 1.99 |
| No. 20 | 78.0 | 13.8 | 0.1 | 2.0 | 0.1 | | 2.0 | 2.0 | 2.0 | | 236 | 22,100 | 71,200 | 2.31 |
| No. 21 | 77.8 | 10.0 | 0.1 | 5.0 | 0.1 | | 2.0 | 2.0 | 3.0 | | 241 | 23,400 | 73,400 | 2.39 |
| No. 22 | 79.0 | 10.8 | 0.1 | 5.0 | 0.1 | 2.0 | | 2.0 | | 1.0 | 218 | 26,300 | 81,200 | 1.75 |
| No. 23 | 80.0 | 8.5 | 0.5 | 4.0 | 0.5 | 1.5 | | 3.0 | | 2.0 | 221 | 28,900 | 90,600 | 1.67 |

The above compositions, including those in Tables 1*a* through 16*d*, and compositions 17 through 23, are characterized by a Hv of at least 160 and a $\mu$ of at least 10,000. These alloy compositions set forth in the aforementioned tables and in compositions 17 through 23, were prepared in accordance with the parameters of the examples set forth above.

BRIEF DESCRIPTION OF THE DRAWINGS

FIG. 1 graphically represents the effect of the change in percentage of tantalum, as one of the essential additives, in compositions of the invention on the Hv values of alloy compositions containing Ta and Cr as essential additive components.

FIG. 2 graphically represents the effect of the variation of the percentage of Nb as an essential additive in alloy compositions of the invention on the Hv value of those alloy compositions of the invention containing Nb and W as two essential additives.

FIG. 3 graphically represents the effect of the change in percentage of chromium on the Hv value of compositions of the invention containing as the two essential elemental additives Cr and W.

FIG. 4 graphically represents the effect of the change of the percentage of Nb on the Hv value, of compositions of the invention containing Nb and Cr as the essential additives.

FIG. 5 graphically represents the effect of the change in percentage of Nb on the Hv value, of compositions of the invention containing as the two essential elemental additives Nb and Ta.

FIG. 6 graphically represents the effect of variations in the percentage of Nb on the Hv values of compositions of the invention containing as the additives the two essential elements Nb and V.

FIG. 7 graphically represents the effect of variation in the percentage of V on the Hv value of compositions of the invention containing as essential elements V and W.

FIG. 8 graphically represents the effect of the variation in percentage of V on the Hv value of compositions of the invention containing as additives the two essential elements V and Cr.

FIG. 9 graphically represent the effect of the variation in percentage of Zr on the Hv value of compositions of the invention containing as the two essential elemental additives, Zr and Ta.

FIG. 10 graphically represents the effect of variation in the percentage of Zr on the Hv values of compositions of the invention containing as essential elements Zr and V.

FIG. 11 represents graphically the efeect of varying the percentage of Zr on the Hv value of compositions of the invention containing Zr and W.

FIG. 12 graphically represents the effect of varying the percentage of Zr on the Hv value of compositions of the invention containing as the two essential additives Zr and Cr.

FIG. 13 graphically represents the effect of varying percentage of titanium on the Hv value of alloy compositions of the invention containing as essential additives Ti and W.

FIG. 14 graphically represents the effect of variation in the percentage of titanium on the Hv value of compositions of the invention containing as the two essential additives Ti and Cr.

FIG. 15 graphically represents the effect of variation in the amount of titanium on the Hv value of compositions of the invention containing Ti and Zr as the two essential additive elements.

FIG. 16 graphically represents the effect of varying the amount of on the Hv value of compositions of the invention containing as the two essential additive elements Ti and Ta.

Figure 1:
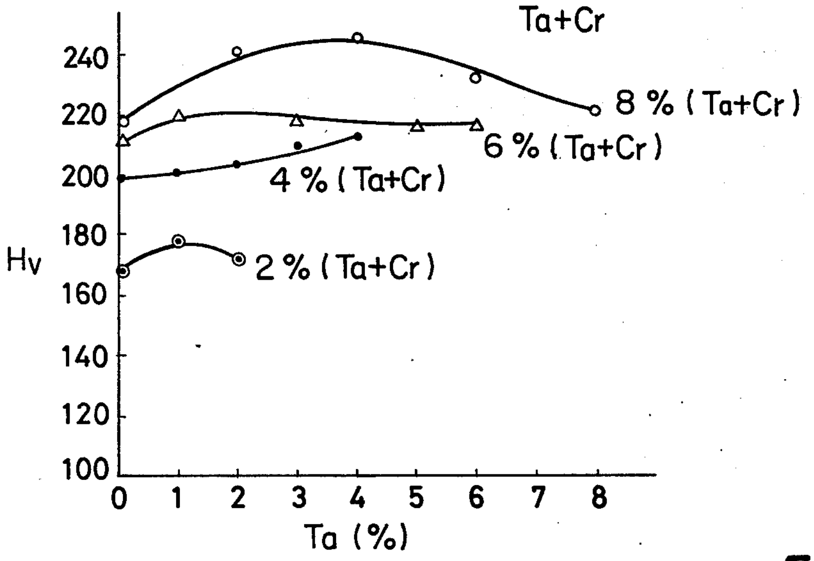
FIGS. 1 through 16 are graphs which are plots of the values Hv of the alloy compositions set forth in the Tables, plotted against the percentage of one of the elements, included as an essential additive, in the compositions of the invention.
Figure 2:
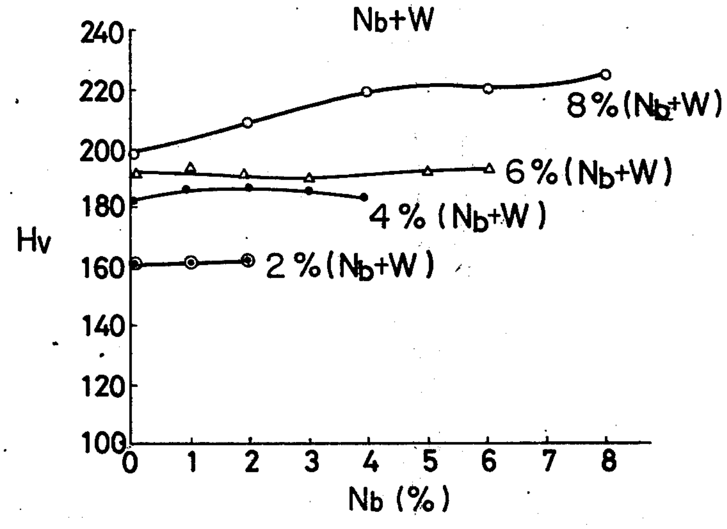
Figure 3:
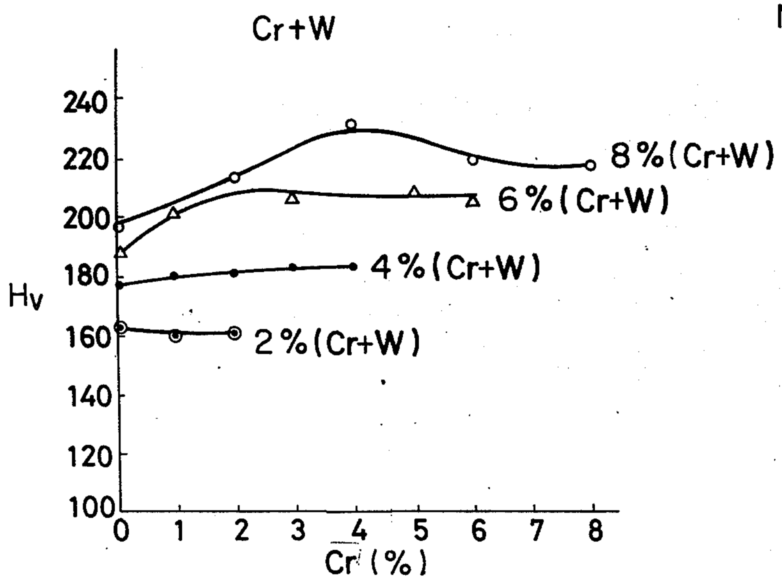
Figure 2A:
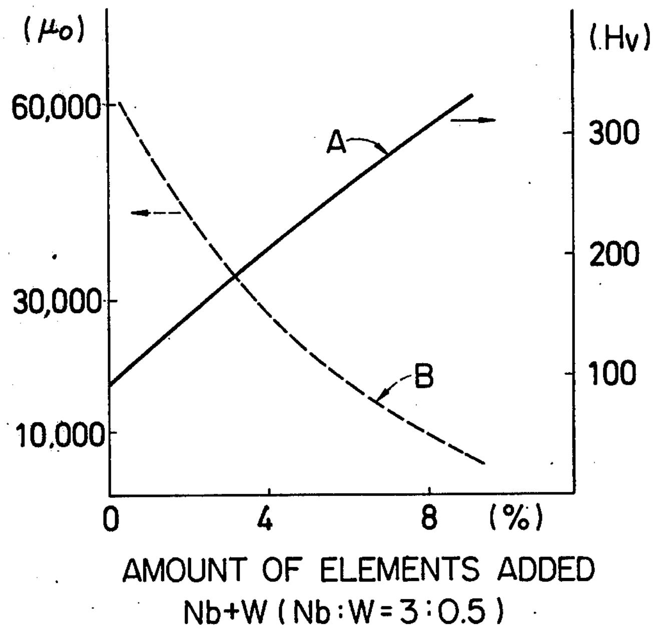
FIG. 2A, the drawing of the parent application, shows the relationship between the amount of the additive and the initial relative magnetic permeability and hardness of the material of the present invention, the additive being niobium(Nb) and tungsten (W), the ratio of Nb to W being 3:0.5. The solid line A shows the change of the hardness and the chain B shows the change of the initial relative magnetic permeability. The drawing of the parent application is based on Example 2 set forth above.
Figure 4:
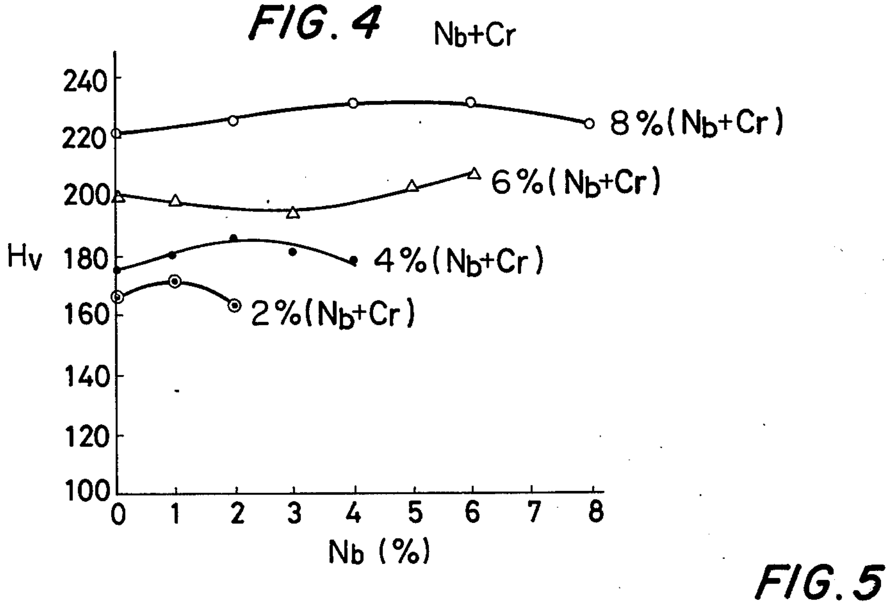
Figure 5:
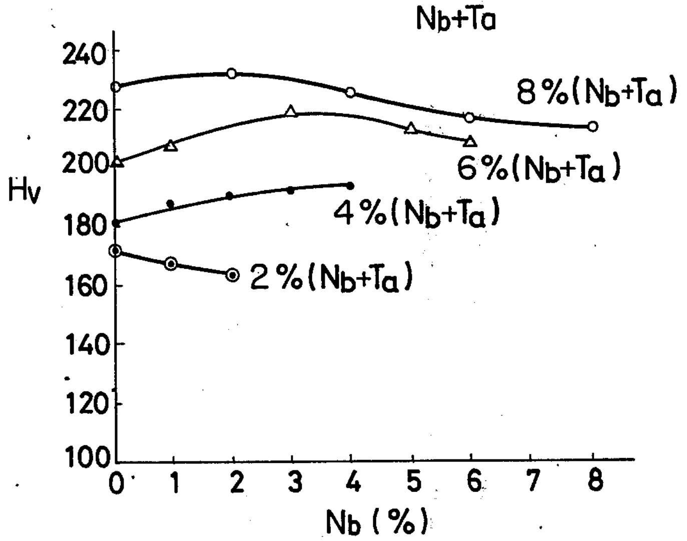
Figure 6:
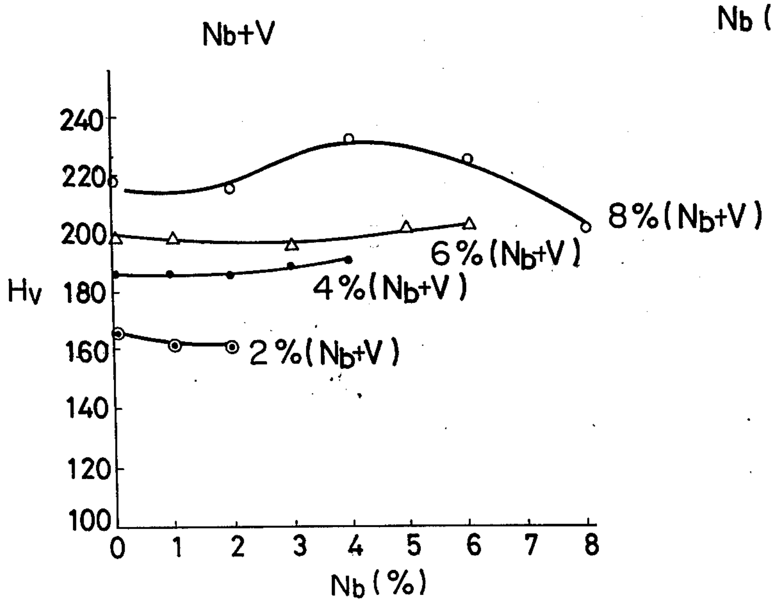
Figure 7:
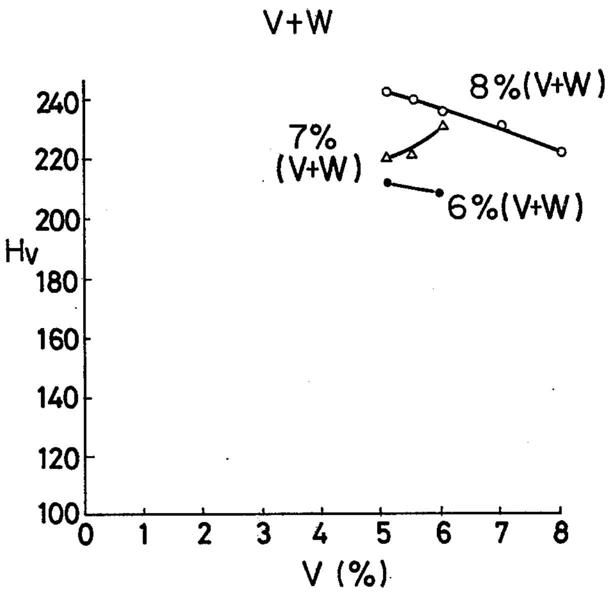
Figure 8:
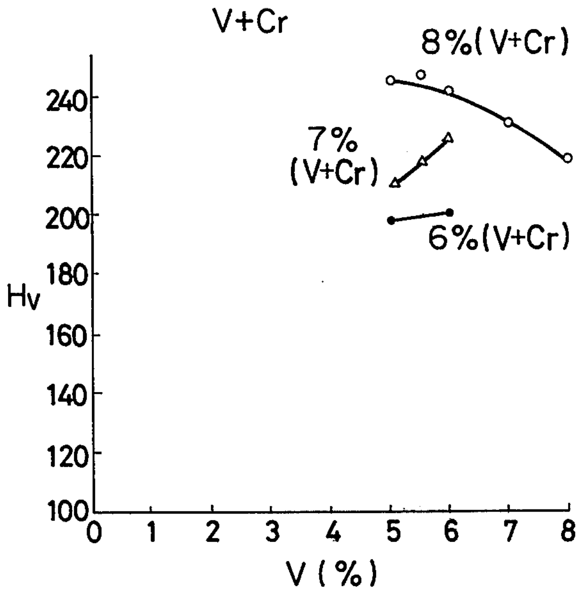
Figure 9:
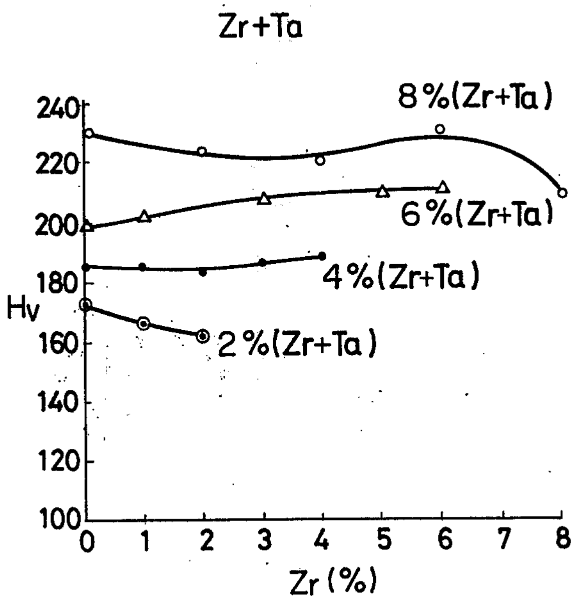
Figure 10:
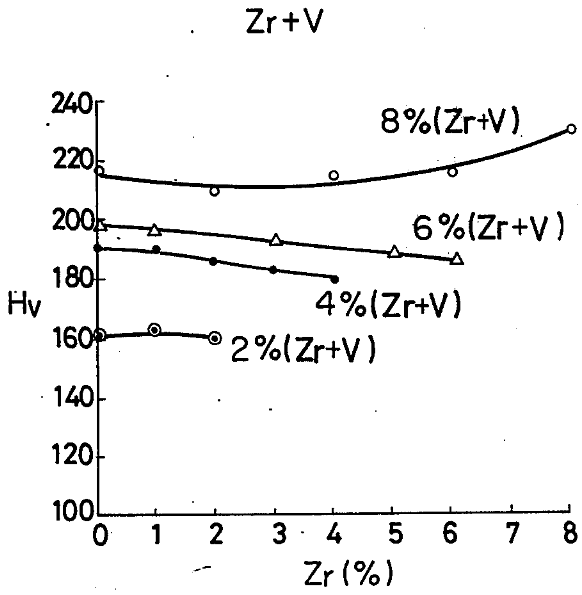
Figure 11:
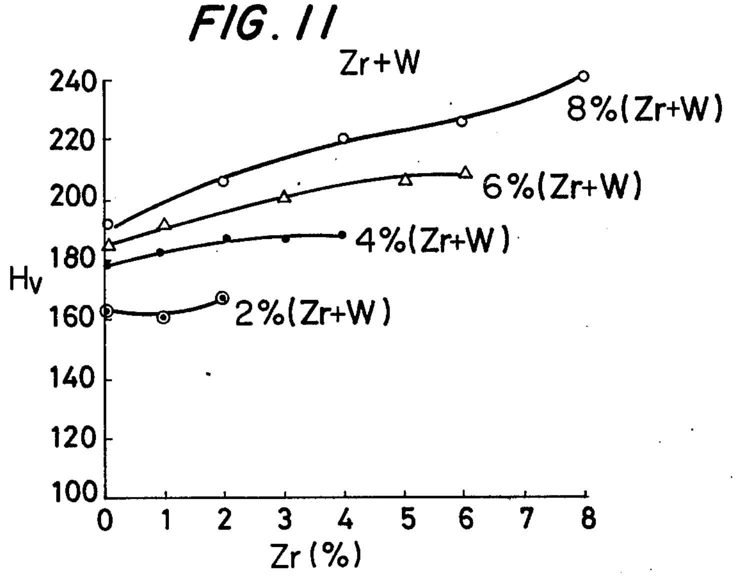
Figure 12:
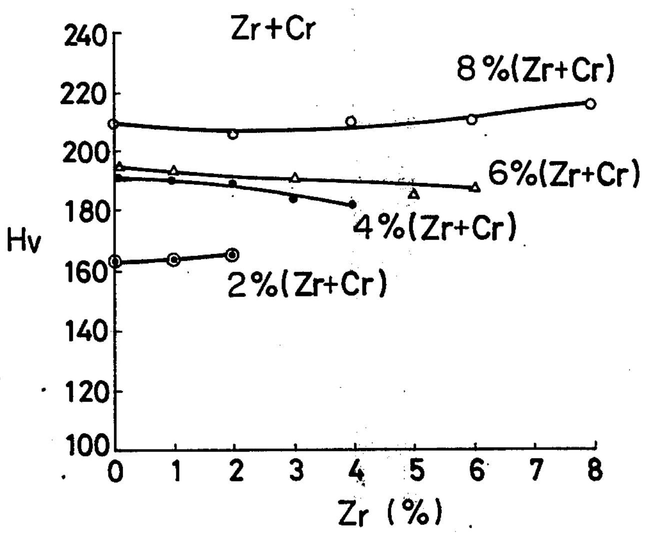
Figure 13:
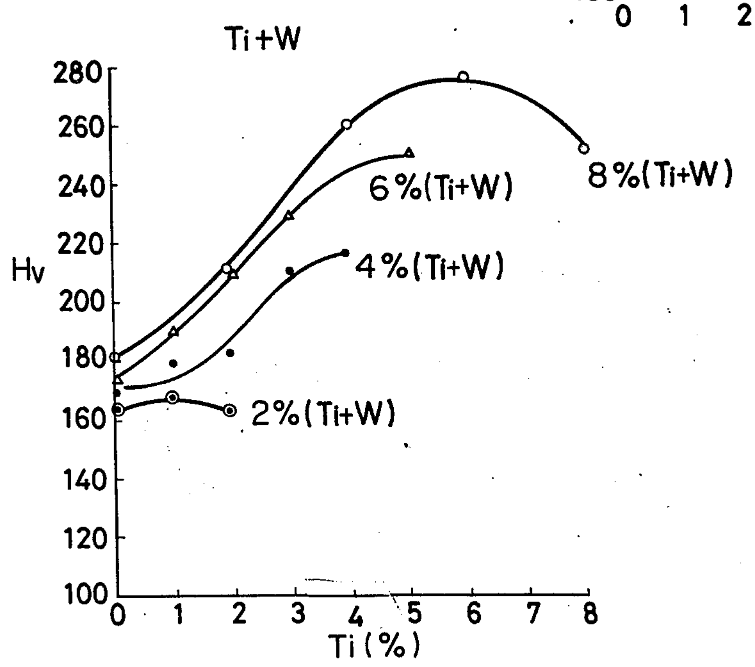
Figure 14:
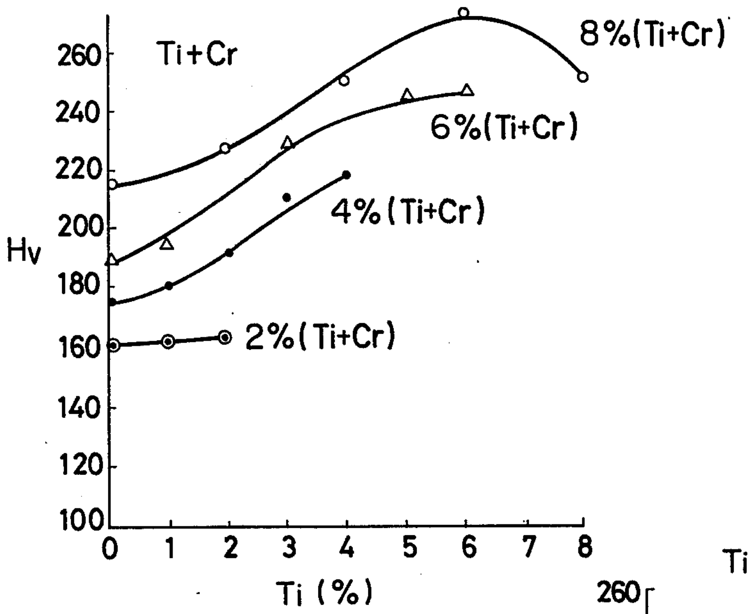
Figure 15:
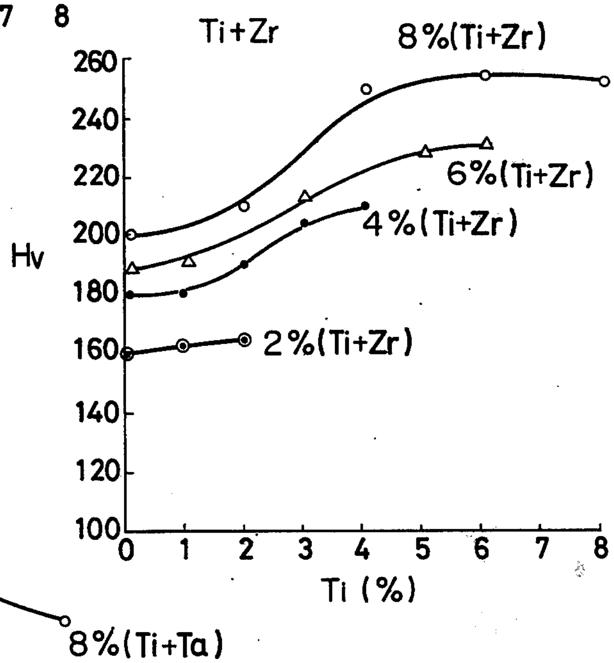
Figure 16:
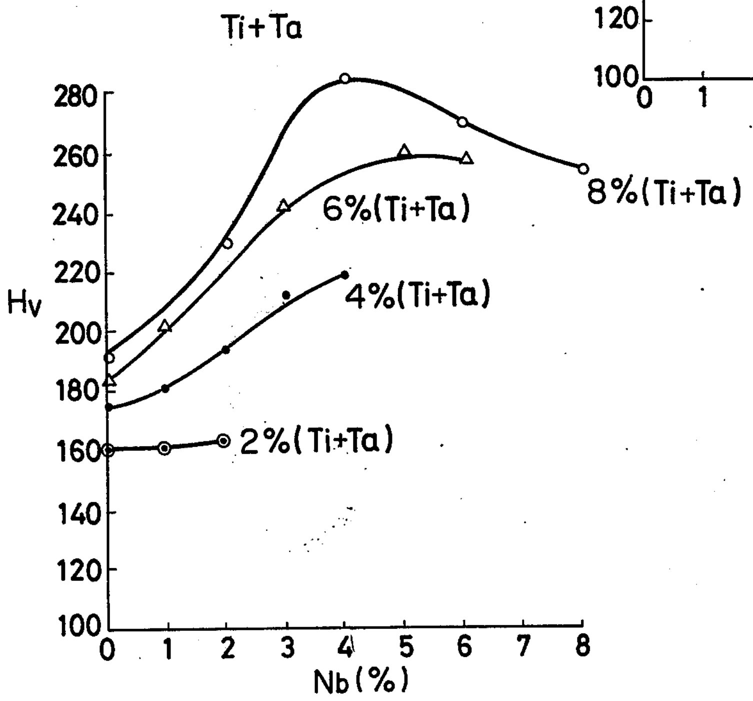

According to the present invention, there can be obtained a material having a high magnetic permeability, which is superior in hardness, without decrease in the value of its magnetic characteristics. By the use of these materials, there can be obtained a magnetic head core having a superior resistance to wear from friction.

What is claimed is:

1. A worked and heat treated magnetic alloy having a high magnetic permeability, consisting of: a base composition consisting of 75–82 weight percent of nickel, 2–6 weight percent of molybdenum, 1 or less weight percent of manganese, 1 or less weight percent of silicon and 7.8–18 weight percent iron; and an additive consisting of at least three different elements, one of said elements being an element selected from a first group of elements including zirconium, vanadium, tantalum, chromium or tungsten; a second element selected from a second group and being titanium, zirconium, vanadium, niobium, tantalum, chromium or tungsten and a third element said element of the second group being different from said element of the first group, said third element being different from said elements of said first group and of said second group; said additive being contained in said alloy in a total amount within the range of 1–8 weight percent, wherein said alloy is characterized by a Hv of at least 160 and a $\mu$ of at least 10,000.

2. The alloy of claim 1, wherein said additive consists of 2% chromium, 2% vanadium, and 1.5% titanium.

3. The alloy of claim 1, wherein said additive consists of 2% chromium, 2% vanadium and 2% titanium.

4. The alloy of claim 1, wherein said additive consists of 2% by weight chromium, 1% by weight vanadium, and 3% by weight titanium.

5. The alloy of claim 1, wherein said additive consists of 2% by weight vanadium, 2% by weight niobium, 2% by weight titanium.

6. The alloy of claim 1, wherein said additive consists of 2% by weight vanadium, 3% by weight niobium, and 2% by weight titanium.

7. The alloy of claim 1, wherein said additive consists of 2% by weight chromium, 1% by weight zirconium, and 2% by weight titanium.

8. The alloy of claim 1, wherein said additive consists of 1.5% by weight chromium, 2% by weight zirconium, and 3% by weight titanium.

9. The alloy of claim 1, wherein the additive consists of three elements, the combination of said three elements being present in amounts ranging between 2–8%, said elements being chromium, vanadium, and titanium.

10. The alloy of claim 1, wherein said additive consists of three elements, present in amounts ranging between 2–8% by weight of the composition of said material, said elements being vanadium, niobium and titanium.

11. The alloy of claim 1, wherein said additive consists of three elements, present in amounts ranging between 2–8%, said elements being chromium, zirconium and titanium.

* * * * *